May 6, 1958 J. G. KAY 2,833,393
DISTRIBUTING CONVEYOR ARRANGEMENTS
Filed Sept. 25, 1956
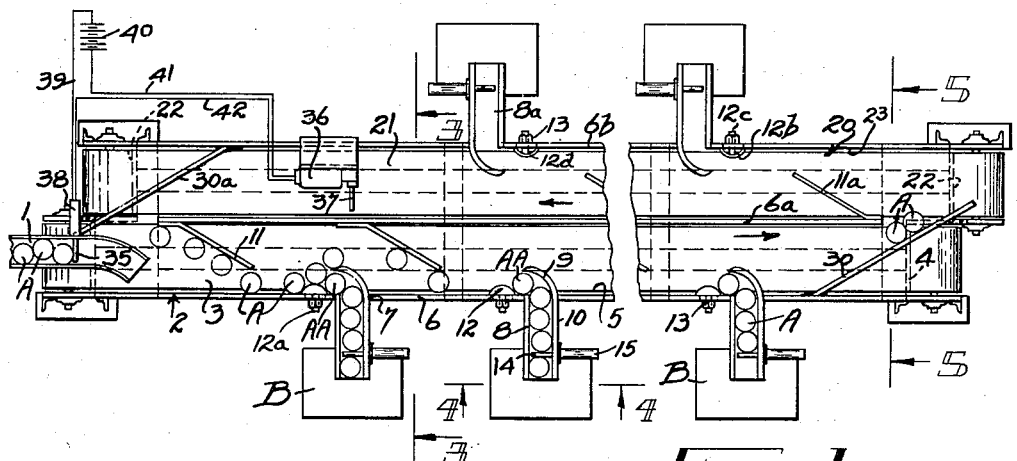
Fig. 1
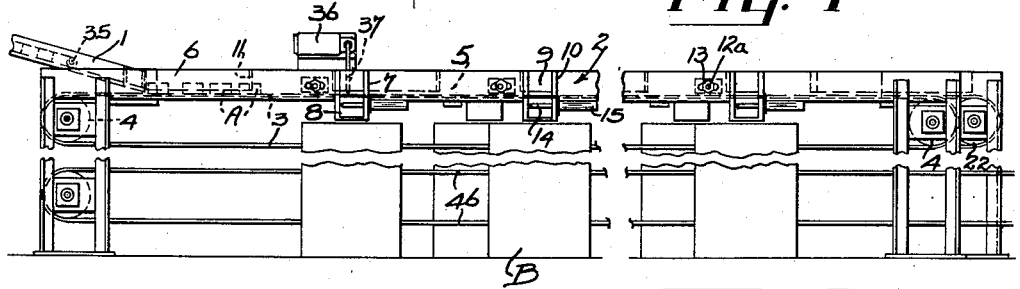
Fig. 2
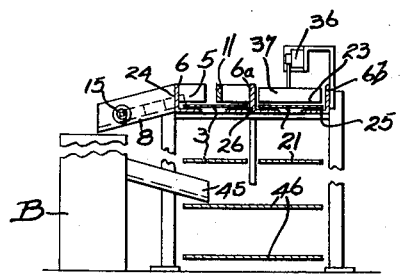
Fig. 3
Fig. 4
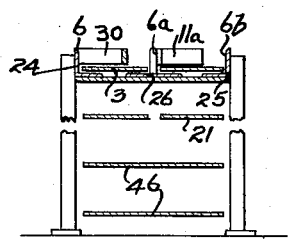
Fig. 5
INVENTOR.
John G. Kay
BY
Gerald J. Baldwin
Attorney

United States Patent Office 2,833,393
Patented May 6, 1958

2,833,393

DISTRIBUTING CONVEYOR ARRANGEMENTS

John G. Kay, Detroit, Mich., assignor to F. Jos. Lamb Company, Detroit, Mich., a corporation of Michigan Application September 25, 1956, Serial No. 611,961

1 Claim. (Cl. 198—85)

This invention relates to distributing conveyor arrangements. It is an object of the invention to provide a distributing conveyor arrangement including a feed conveyor laterally from which a plurality of delivery chutes extend from different points therealong for discharging workpieces to different stations; to provide stationary means on the feed conveyor for diverting workpieces travelling thereon into each chute progressively until it is full, and utilizing the last workpiece by which each chute is filled for diverting following workpieces so that they travel past that filled chute to the next one. Thus progressively all the chutes are filled and kept full.

The invention also aims, among other things, to provide a distributing conveyor arrangement including a supply conveyor which normally feeds workpieces onto the feed conveyor; a recirculating conveyor onto which all workpieces which have travelled upon the feed conveyor past all the delivery chutes extending therefrom are discharged for return to the supply end of the feed conveyor for repassage past the delivery chutes; wherein other delivery chutes may be arranged to extend from the recirculating conveyor to discharge workpieces from the latter to additional receiving stations; and wherein means operated by the passage of workpieces past a predetermined location on the recirculating conveyor stops the flow of workpieces from the supply conveyor onto the feed conveyor until after the workpieces on the recirculating conveyor which have passed all the delivery chutes extending therefrom have been returned onto the feed conveyor. Thus the feed and recirculating conveyors function also as storage units to maintain a supply of workpieces to keep the delivery chutes full should a temporary stoppage occur in the flow of workpieces from the supply conveyor.

With these and other objects and advantages in view which will become apparent as the specification proceeds, the invention is hereinafter more fully described with the aid of the accompanying drawing, in which:

Figure 1 is a plan view of the invention, and
Figure 2 is a side elevation thereof.
Figures 3, 4 and 5 are sections on the lines 3—3, 4—4 and 5—5, respectively, of Figure 1.

Referring to the drawing, 1 designates a supply conveyor, shown in the form of a gravity chute, the discharge end of which terminates over and adjacent one extremity of a feed conveyor 2 to deliver workpieces or articles A onto the latter. The feed conveyor includes a conventional endless belt or chain 3 which passes around pulleys or sprockets 4 mounted adjacent opposite extremities of the conveyor. One pulley or sprocket 4 is driven by any preferred means—not shown—and the upper strand of the belt or chain 3 travels along a trough 5 having opposed upwardly projecting sidewalls 6 and 6a. Projecting laterally from the sidewall 6 and in registry with spaced openings 7 formed therethrough are delivery chutes 8 each of which is adapted to receive workpieces A from the feed conveyor and deliver them to a receiving station B, which may consist of a machine equipped with automatic loading equipment.

An extension 9 projects inwardly from the front wall 10 of each delivery chute 8 partway across and above the belt 3 and terminates in a rearwardly curved extremity spaced between the sidewalls 6a and 6 and somewhat nearer to the latter. It will also be noted that the belt 3 is preferably somewhat more than double the width of the delivery chutes 8. Workpieces travelling upon the belt are adapted to pass between the sidewall 6 and one of the extensions 9 to be plowed thereby into the chute 8 in front of it, some workpieces however are laterally diverted in a manner hereinafter described onto the other side of the belt behind the extensions 9 and pass between the latter, or some of them, and the sidewall 6a for continued travel upon the belt 3.

Mounted on the sidewall 6a and spaced behind each delivery chute 8 is a stationary deflector plate 11 which is forwardly and inwardly inclined and projects sufficiently toward the sidewall 6 to force workpieces riding upon the belt 3 laterally into close proximity with the said sidewall. Secured on the inner face of the sidewall 6 between each deflector plate 11 and the delivery chute 8 immediately in front of it is a diverter 12 which is arcuate longitudinally of the feed conveyor and may consist either of the convex head of a bolt 12a which projects outwardly through an opening formed through the sidewall 6 to which it is secured by a nut 13, or of a longitudinally arched plate 12b from the inner face of which a threaded stem 12c projects through the sidewall to which it is secured by the nut 13.

As workpieces A travelling upon the belt 3 come into contact with a deflector plate 11 they are thrust laterally into proximity with the sidewall 6 so that they strike the adjacent diverter 12 by which they are urged somewhat toward the center of the belt 3, however unless the adjacent chute 8 is already full these workpieces pass thereinto between the sidewall 6 and the rearwardly curved extension 9. When that chute is full the last workpiece therein assumes a position AA and projects rearwardly behind the extension 9, then following workpieces after passing the diverter 12 strike an outwardly and forwardly inclined side of the workpiece held at AA adjacent its rear extremity and are successively thrust toward the sidewall 6a thereby to travel upon the belt 3 between the said sidewall and the adjacent face of the extension 9. When this happens these travelling workpieces pass to the next delivery chute which they enter if it is not already full, otherwise they bypass that chute too in the manner above described.

Mounted in each delivery chute 8 adjacent its discharge extremity is a suitable releasable stop or gate 14 so positioned that a workpiece held at AA when the chute is completely filled is located at the required position between the diverter 12 and the rear extremity of the extension 9 to impart the above described lateral movement to other workpieces being transported on the feed conveyor 2. In the present instance each stop 14 is actuated by a solenoid 15 one side of which is connected by a lead 16 to a source of power 17 through a switch 18 and its opposite side is directly connected by a lead 19 to the source of power; however other means for operating the stops 14 may be utilized when required.

Extending parallel with an immediately adjacent the feed conveyor 2 is a recirculating conveyor 20 including a conventional endless chain or belt 21 which passes around sprockets or pulleys 22 adjacent opposite extremities of the conveyor. One pulley 22 is driven by any preferred means—not shown—and the upper strand of the belt 21 travels along a trough 23 defined between an upwardly projecting sidewall 6b and the sidewall 6a. It will also be noted that the belts 3 and 21 travel in opposite directions. In the present instance, as may be readily seen from Figure 3, the conveyors 2 and 20 include outer angle members 24 and 25 which form parts of the troughs 5 and 23, and of the sidewalls 6 and 6b, respectively. The central sidewall 6a of both the conveyors 2 and 20 is formed by the vertical flange of a T-shaped member 26 the horizontal flanges of which form the inner sides of the troughs 5 and 23. From opposite extremities the vertical flange of the T-shaped member which forms the sidewall 6a is removed for a short distance so that workpieces may be plowed from one conveyor to the other.

Suitably secured to the inner face of the sidewall 6 of the feed conveyor 2 in front of the foremost chute 8 projecting therefrom is a plow 30 which extends forwardly and inwardly over the belt 3 and terminates over the belt 21 of the recirculating conveyor 20 which travels in the opposite direction to the conveyor 2. By this plow all workpieces as they approach the front extremity of the feed conveyor are transferred onto the recirculating conveyor. Secured to the inner face of the sidewall 6b of the conveyor 20 adjacent its other extremity is a plow 30a which extends forwardly and inwardly over the belt 21 and terminates over the belt 3. In this manner workpieces are brought back by the recirculating conveyor and delivered onto the starting end of the feed conveyor for re-passage past the chutes 8. Furthermore the conveyors 2 and 20 thus constitute storage units for additional workpieces so that the chutes may be kept filled if delivery from the supply conveyor 1 is temporarily halted.

It will be seen that my distributing conveyor arrangement may be utilized between opposed rows of stations or machines B, as shown in Figure 1. In that event the recirculating conveyor 20 is also employed as an auxiliary feed conveyor and is provided with deflecting plates 11a, diverters 12d and delivery chutes 8a extending therefrom, all identical with and adapted to function in exactly the same manner as the corresponding parts already described in connection with the feed conveyor 2.

Mounted on the supply conveyor 1 adjacent its discharged extremity is a stop or gate 35 which may be actuated in any preferred manner to halt the flow of workpieces A onto the belt 3. In the present instance this is done in the following manner: Mounted upon the recirculating conveyor 20 adjacent and behind the plow 30a is a switch 36 having a pendulum arm 37 which extends across and above the belt 21 and is moved by workpieces passing it to close the switch. The stop 35 is connected to a solenoid 38 so that when the latter is energized the stop projects across the supply conveyor 1, as shown in Figure 1, and interrupts the flow of workpieces onto the belt 3. Extending from the solenoid 38 is a lead 39 which is connected to a source of power 40 and from the latter another lead 41 is run to the switch 36. The latter is also connected to the solenoid 38 by a wire 42. The switch 36 also includes a known type of delayed action mechanism so that it does not reopen until sufficient time has elapsed after passage of the switch-actuating workpieces for the latter to have been transferred by the plow 30a onto the belt 3.

The drawing also shows that other chutes 45 extend from the machines or stations B for discharging workpieces therefrom onto another conveyor 46 extending beneath the belts 3 and 21 for transporting them to a desired location.

From the foregoing it is of course understood that workpieces A are thrust somewhat away from the sidewall 6 by the diverters 12, or 12d; the rear extremity of each extension 9 is so shaped that workpieces passing into the adjacent chute are quickly forced back against the sidewall 6 as they progress; and that the last workpiece AA by which the chute is filled lies against the sidewall 6 and projects behind the rear extremity of the extension. The inward lateral thrust imparted by the diverter to following workpieces is sufficient to force them inwardly across the belt 3 to strike the workpiece at AA inwardly of a line passing through the axis of the latter parallel with the direction of travel of the belt. Thus following workpieces are thrust by the one at AA far enough across the belt to pass between the sidewall 6a and the face of the extension 9 adjacent thereto.

While in the foregoing the preferred embodiment of the invention has been described and shown it is understood that alterations and modifications may be made thereto provided they fall within the scope of the appended claim.

What I claim is:

An article distribution conveyor system comprising in combination: a pair of adjacent oppositely driven belt type article supporting conveyors each of a width sufficient to support a plurality of articles distributed abreast one another on the conveyor, a partition extending along between the conveyors, an outer wall extending along the outside edge of each conveyor and each forming with the partition conveyor guideways for articles on the conveyors moving in opposite directions, a recirculating diverter wall at opposite ends of the conveyors to divert articles from the downstream end of one conveyor to the upstream end of the other conveyor, a plurality of chutes disposed spaced apart along the outer wall of each conveyor to receive articles from each conveyor, a plow disposed adjacent the downstream side of each chute and extending over the associated conveyor from the outer wall a distance only just exceeding the maximum horizontal dimension of each article to guide one article at a time into the chute from the conveyor, a plurality of diverters for each conveyor extending from said partition toward the outer wall with one diverter at the upstream side of each plow to divert articles toward the outer wall of the conveyor, a deflector disposed adjacent the outer wall at the upstream side of each chute and spaced from the point of the plow a distance just exceeding the maximum horizontal dimension of each article to closely guide one article at a time into the chute from the conveyor, each deflector having a convex article-abutting surface, stop means in each chute spaced along the chute a distance such that when the chute is filled with articles the last article plowed thereinto by the plow lies between the plow and the deflector with the plow point and the high point of the convex surface of the deflector and the surface of said last article lying substantially on a line inclined inwardly of the conveyor from the outer wall thereof and in the direction of the conveyor travel, whereby succeeding articles are deflected around the plow.

References Cited in the file of this patent

UNITED STATES PATENTS

| | | |
|---|---|---|
| 860,936 | Norkewitz | July 23, 1907 |
| 2,215,702 | Holm | Sept. 24, 1940 |
| 2,488,888 | Albertoli | Nov. 22, 1949 |
| 2,583,313 | Albertoli | Jan. 22, 1952 |
| 2,804,961 | Carter | Sept. 3, 1957 |

FOREIGN PATENTS

| | | |
|---|---|---|
| 749,235 | Great Britain | May 23, 1956 |